E. C. HELMKE.
HUB CONSTRUCTION FOR FOUR WHEEL DRIVE VEHICLES.
APPLICATION FILED OCT. 16, 1913.
1,124,433. Patented Jan. 12, 1915.
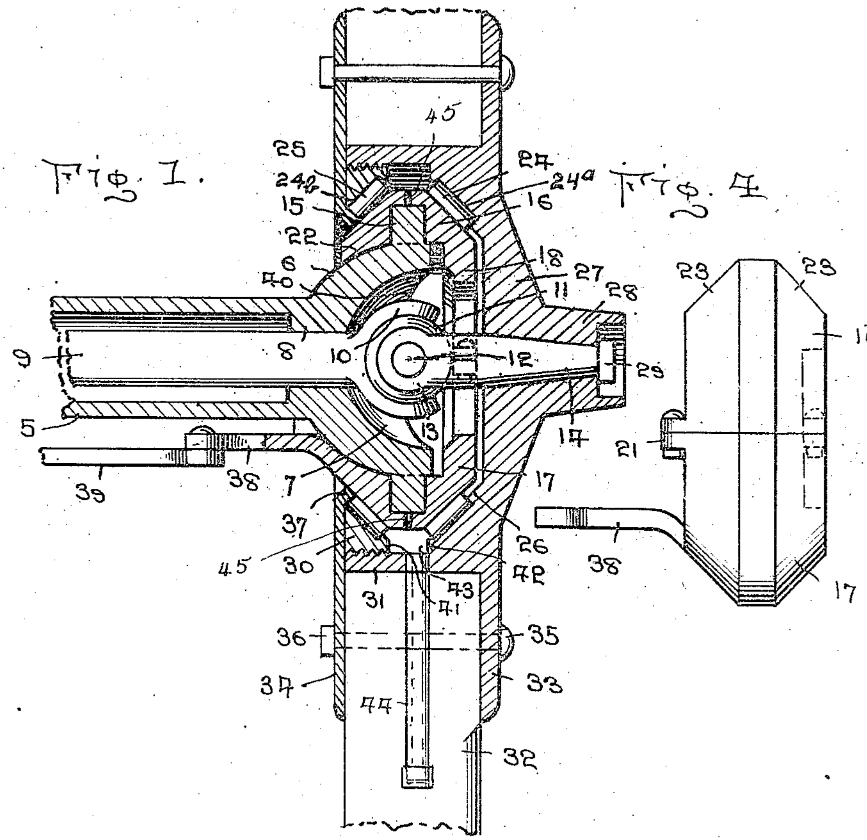
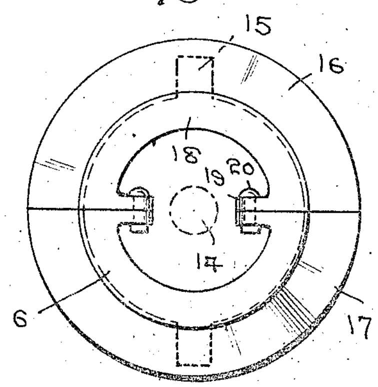
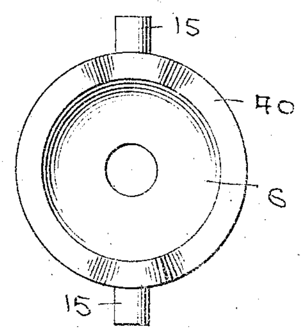
Inventor
E. C. Helmke
Witnesses
Thos. W. Riley
Allan Farmer
By W. T. Fitzgerald & Co
Attorney

UNITED STATES PATENT OFFICE.

EDWARD CARL HELMKE, OF McFARLAND, WISCONSIN.

HUB CONSTRUCTION FOR FOUR-WHEEL-DRIVE VEHICLES.

1,124,433. Specification of Letters Patent. Patented Jan. 12, 1915.

Application filed October 16, 1913. Serial No. 795,530.

*To all whom it may concern:*

Be it known that I, EDWARD C. HELMKE, a citizen of the United States, residing at McFarland, in the county of Dane and State of Wisconsin, have invented certain new and useful Improvements in Hub Constructions for Four-Wheel-Drive Vehicles; and I do hereby declare the following to be a full, clear, and exact description of the invention, such as will enable others skilled in the art to which it appertains to make and use the same.

This invention relates to a hub construction for four wheel drive vehicles, and the principal object thereof is to provide a hub whereby the weight of the vehicle is delivered to the center of the wheels.

A further object of the invention is to provide a wheel hub of the class described, embodying in its construction a ball and socket joint, which joint occurs centrally of the hub and not to one side of the wheel.

Another object of the invention is the provision of a hub of the class described, the working parts of which are dust proof.

Still another object is the provision of a hub of the class described which will be simple, durable, inexpensive to manufacture, efficient in operation, and embodying features of general improvement of hubs of this class.

With these and other objects in view which will become apparent as the description proceeds the invention resides in the construction, combination, and arrangement of parts hereinafter more fully described and claimed and illustrated in the accompanying drawing in which like characters of reference indicate corresponding parts throughout the several figures, of which, Figure 1, represents a vertical, transverse, sectional view through the hub and adjacent parts. Fig. 2, represents an inside elevational view of the bearing cup. Fig. 3, represents a front elevational view of the bearing rim showing the cup in dotted lines in position therein, and Fig. 4, represents an edge elevational view of the bearing rim.

Referring more particularly to the drawing, an axle 5 is made tubular and has cast integrally therewith at each end, a bearing cup 6 which is in the general form of a hemisphere and which is concaved at 7, into which concavity through the rear wall 8 of the cup extends one end of the drive shaft 9 said shaft provided with curved arms 10 between which is pivoted a ball 11, at diametrically opposed points, and in the same plane with said pivoted points, but at right angles thereto, is pivoted on said ball by means of pins 12 the curved arms 13 of a stub axle 14, the construction just described forming a universal joint between the drive shaft and stub axle.

The cup 6 is provided at diametrically opposite points in the same plane with the pivot points of the universal joint, with a pair of pivot lugs 15 which extend into recesses formed centrally in the inner surfaces of the upper and lower sections 16 and 17 respectively, forming a bearing rim, said sections being substantially semicircular in form and provided with inwardly projecting flanges 18 the ends of which are provided with lugs 19 through which bolts 20 pass for securing the sections together said sections also provided on their inner faces at their meeting ends with lugs 21 for further securing the sections. The inner rear face of the bearing rim is concaved as at 22, and fits snugly against the outer convex face of bearing cup 6, and the periphery of the bearing rim, is oppositely beveled as at 23, said beveled portions forming bearing surfaces for sets of anti-friction rollers 24 and 25 respectively, set 24 being carried by the inner annularly beveled face 26 of a wheel casting 27 having an annular recess 24^a formed therein to receive said rollers and through the hub portion 28 of the casting, the conically shaped outer end of stub axle 14 extends, said axle being fixedly secured to the wheel casting by means of a nut 29. The opposite set of rollers 25 is carried by a ring having a beveled surface to match a beveled face on said bearing rim and an annular recess 24^B therein formed to receive one set of rollers 30 which is screw threaded into a flange 31 integral with the wheel casting and against which flange the inner ends of the spokes 32 rest. The outer side faces of said spokes rest against a vertical flange 33 on the wheel casting, while against the inner side faces of the spokes a collar 34 rests, said collar, spokes and flange 33 being secured together by means of bolts 35 passing therethrough, the inner ends of which are threaded for receiving nuts 36.

Collar 34 rests against the edge of the horizontal flange 31 and also bears against ring 30 and has its inner edge formed with an inturned flange 37 which abuts against one of the beveled faces 23 of the bearing rim, adjacent rollers 25, serving the double purpose of preventing the entrance of dust around the bearing rim, and of helping to maintain rollers 25, in position. The lower section 17 of the bearing rim has formed centrally thereon, an outwardly extending curved arm 38 which is positioned in spaced relation to axle 5 and which is pivoted to one end of a reach rod 39, by means of which the bearing rim may be rotated on its pivot points 15 whereby the wheel is swung for guiding the vehicle. In this connection it will be noted that the inner edges of cup 6 are somewhat cut away as at 40 on the opposite sides of the bearing pins 15 so that flange 18 will not strike against the bearing cup as the wheel is turned, and it will be further noted that plenty of space occurs between the ends of lugs 19 for allowing the stub axle 14 to pass therebetween. The ring 30 has an inner edge 41 thereon, which with the shoulder 42, formed on the wheel casting adjacent the beveled face 26 thereof and in coöperation with the flange 31, forms an oil runway 43 to which oil may be admitted through a hollow tube 44, threaded or otherwise secured to flange 31 between a pair of spokes, and from the runway or duct 43 oil is admitted to the roller bearings 24 and 25, and to the pivot points 15 by means of passages 45 provided in the bearing rim sections and connecting with the recesses therein, in which the pivot points 15 are seated. It will be noted by this construction, that the weight of the vehicle will be delivered centrally of the hub, and will thus equalize the strain upon the hub. As is obvious, the hub may be very easily and quickly assembled or disassembled, and in this connection it will be noted that by reason of the nuts 36 being on the inner ends of bolts 35 the spokes may be removed with the wheel casting thus making the wheel simpler to remove than if the nuts were on the outer end of the bolts. If it should be desirable to have the reach rod positioned above the axle all that would be necessary would be to reverse the position of the sections forming the bearing rim.

My construction wherein the driving connection and the supporting point between the wheel and axle, fall in the central radial plane of the wheel, is obviously advantageous over the construction of many hubs, in which the driving connection and supporting point occur to one side of the wheel, for the driving power is applied to the center of the hub and there is no strain on the reach rod except that caused in turning the wheels, in the construction referred to, however, there being a continuous strain on the reach rod in holding the wheels in a straight position because the supporting point is to one side of the wheel.

Although I have described the preferred embodiment of my invention I may desire to make such changes in the construction, combination, and arrangement of parts as do not depart from the spirit of the invention and the scope of the appended claim.

Having thus fully described my invention what I claim as new and desire to secure by Letters Patent is:—

The combination with a bearing cup on the end of an axle, of a wheel casting, having a threaded flange; a ring threaded therein; a bearing rim pivotally mounted on said bearing cup, said bearing rim being composed of two complementary parts semicircular in form and having two beveled faces, means to fasten the two parts together and an outwardly extending arm located on the lower part; anti-friction rollers interposed between said beveled faces of the bearing rim and said wheel casting and ring; a retaining collar bearing against said flange, ring and rollers; means to hold said collar in place; a driving shaft having a universal joint and means for connecting said shaft to said wheel casting.

In testimony whereof I have signed my name to this specification in the presence of two subscribing witnesses.

EDWARD CARL HELMKE.

Witnesses:

J. S. JOHNSON,

SARAH JOHNSON.

Copies of this patent may be obtained for five cents each, by addressing the "Commissioner of Patents. Washington, D. C."